US005100007A

United States Patent [19]

Espasandin et al.

[11] Patent Number: 5,100,007

[45] Date of Patent: Mar. 31, 1992

[54] GAS CYLINDER SUPPORT APPARATUS

[75] Inventors: Timothy M. Espasandin, Haywood, Calif.; James E. Greenberg, late of Haywood, Calif.

[73] Assignee: Safe-T-Rack System, Inc., Sunnyvale, Calif.

[21] Appl. No.: 421,567

[22] Filed: Oct. 12, 1989

Related U.S. Application Data

[62] Division of Ser. No. 157,465, Feb. 17, 1988, Pat. No. 4,899,895.

[51] Int. Cl.[5] ........................................ F16L 5/00

[52] U.S. Cl. ........................................ 211/71; 248/313

[58] Field of Search .................... 211/71, 74, 60.1; 248/313, 310, 311.3, 219.4, 231

[56] References Cited

U.S. PATENT DOCUMENTS

| | | | |
|---|---|---|---|
| 583,521 | 6/1897 | Walsh | 248/313 X |
| 1,112,300 | 9/1914 | Ligeoux | 248/313 X |
| 1,361,752 | 12/1920 | Cross | 248/313 |
| 3,261,380 | 7/1961 | Holleman | 248/313 X |
| 3,347,572 | 10/1967 | Pfaff, Jr. et al. | 248/231 X |
| 3,638,802 | 2/1972 | Westerfield | 211/71 |
| 3,791,403 | 2/1974 | Folkerth | 248/313 X |
| 3,913,778 | 10/1975 | Oglesbee | 211/74 X |
| 4,030,690 | 6/1977 | Hanover et al. | 248/311.3 |
| 4,168,007 | 9/1979 | Rohatensky | 211/71 |
| 4,304,383 | 12/1981 | Houston | 248/313 |
| 4,489,910 | 12/1984 | Ferguson | 248/219 X |
| 4,597,031 | 6/1986 | Tsuyama | 248/231 X |
| 4,678,147 | 7/1987 | Barnes et al. | 248/231 X |
| 4,688,685 | 8/1987 | Brace | 211/60.1 X |
| 4,860,986 | 8/1989 | Couzens | 248/313 |

FOREIGN PATENT DOCUMENTS

| | | | |
|---|---|---|---|
| 927937 | 11/1947 | France | 211/71 |

*Primary Examiner*—Alvin C. Chin-Shue
*Attorney, Agent, or Firm*—Rosenblum, Parish & Bacigalupi

[57] ABSTRACT

The modular gas cylinder storage system of the present invention includes several gas cylinder holding devices which are incorporated into an overall cylinder holding system which holds different-sized cylinders. It includes a rack structure that is modular and designed to hold large tanks. A plurality of smaller cylinders are held in several differing basket configurations which basket configurations are formed to mate with the modular rack structure. Barriers for dividing cylinders holding incompatible chemicals are held in place by brackets attaching the barriers to the rack structure. Secure fastening of large cylinders is achieved utilizing a gas cylinder gas storage bracket which is bolted to other structural members having a concave face which mates with the curved surface of the gas cylinder. A flexible strap with an adjustabe buckle passes through the bracket and around the cylinder for a tight, secure engagement of the cylinder within the bracket.

3 Claims, 16 Drawing Sheets

GAS CYLINDER SUPPORT APPARATUS

This application is a division of Ser. No. 157,465, filed Feb. 17, 1988 now U.S. Pat. No. 4,899,895, issued Feb. 13, 1990.

BACKGROUND OF THE INVENTION

1. Field of the Invention

The present invention relates to systems and devices for the safe storage of gas cylinders and more particularly to a modular apparatus for holding gas cylinders that is designed for free-standing and wall-anchored gas cylinder storage configurations.

2. Description of the Prior Art

Gas cylinders are typically stored in a vertical configuration to preserve floor space and promote ease of handling. Free-standing gas cylinders, whether in use or in storage, can easily topple over through mishandling, accidents, or earth tremors. In such mishaps, not only could toxic or flammable gas escape from the cylinder, but the highly-compressed gas could turn the cylinder into a dangerous projectile.

Storage systems to support large cylinders in a vertical configuration typically employ chains or straps which secure the cylinders to walls or other structural members. However, smaller cylinders present added problems as it is difficult to achieve a tight grasp of the smaller cylinders utilizing chains. Thus, the prior art systems permit the smaller cylinders to move and rattle against one another. In such systems the various-sized cylinders retain the possibility of toppling into one another, thus permitting the possibility of hazardous accident.

SUMMARY OF THE INVENTION

It is an object of the present invention to provide a modular system of storage devices which stabilize gas cylinders while in use or in storage.

It is another object of the present invention to provide a modular gas cylinder storage system which safely and securely holds gas cylinders of differing sizes in a vertical configuration.

It is a further object of the present invention to provide a storage system which is modular in design such that it can be incorporated into floor-mounted storage units and wall-anchored storage units.

It is yet another object of the present invention to provide a gas cylinder storage system which can securely hold a plurality of gas cylinders in a free-standing mode for easy and safe use.

It is yet a further object of the present invention to provide a gas cylinder storage system which can provide the required fire separation between non-compatible gases.

The modular gas cylinder storage system of the present invention includes several gas cylinder holding devices which are incorporated into an overall cylinder holding system which holds different-sized cylinders. It includes a rack structure that is modular and designed to hold large tanks. A plurality of smaller cylinders are held in several differing basket configurations, which basket configurations are formed to mate with the modular rack structure. Barriers for dividing cylinders holding incompatible chemicals are held in place by brackets attaching the barriers to the rack structure. Secure fastening of large cylinders is achieved utilizing a gas cylinder gas storage bracket having a concave face which mates with the curved surface of the gas cylinder. A flexible strap with an adjustable buckle passes through the bracket and around the cylinder for a tight, secure engagement of the cylinder within the bracket. Bolt holes are provided to join the bracket to a wall, beam, or other structural member. The various elements of the modular system of the present invention are thus suitable for holding a plurality of gas cylinders of different sizes and for separating those gas cylinders having incompatible chemicals.

It is an advantage of the present invention that it provides a modular system of storage devices which stabilizes gas cylinders while in use or in storage.

It is another advantage of the present invention that it provides a modular gas cylinder storage system which safely and securely holds gas cylinders of differing sizes in a vertical configuration.

It is a further advantage of the present invention that it provides a storage system which is modular in design such that it can be incorporated into floor-mounted storage units and wall-anchored storage units.

It is yet another advantage of the present invention that it provides a gas cylinder storage system which can securely hold a plurality of gas cylinders in a free-standing mode for easy and safe use.

It is yet a further advantage of the present invention that it provides a gas cylinder storage system which can provide the required fire separation between non-compatible gases.

The foregoing and other objects, features, and advantages of the present invention will be apparent from the following detailed description of the preferred embodiments which make reference to the several figures of the drawing.

IN THE DRAWING

DESCRIPTION OF THE PREFERRED EMBODIMENTS

Figure 1:
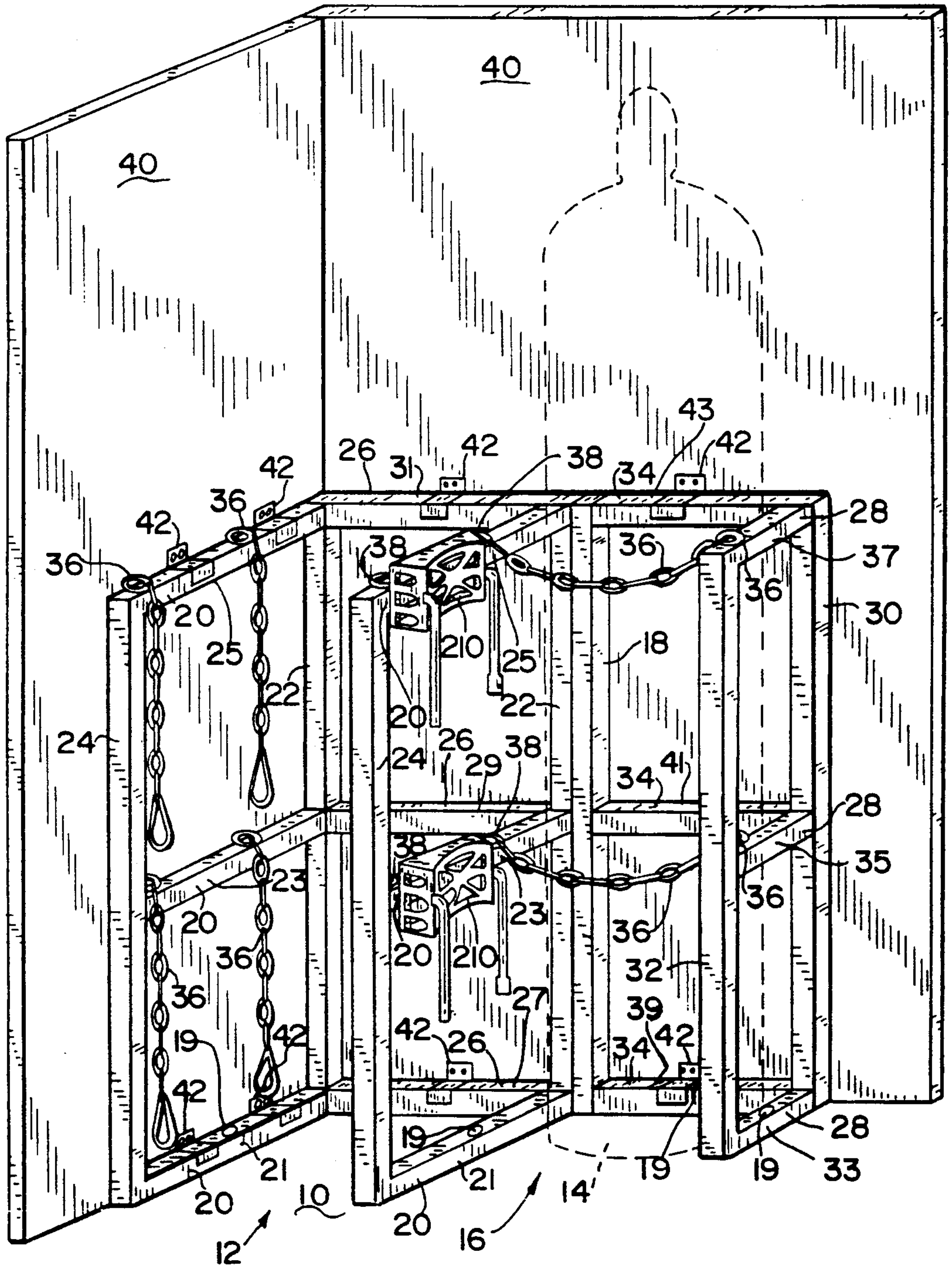
FIG. 1 is a perspective view of the modular gas cylinder support structure of the present invention.

FIG. 1 depicts a gas cylinder support structure 10 of the present invention. As will appear from this description, the support structure is modular and can be configured in many ways utilizing the basic elements and concepts discussed hereinafter. The basic support structure 10 is formed utilizing frame members of particularly chosen lengths. As depicted in FIG. 1, the support structure 10 is formulated to hold two large gas cylinders in bay 12. The frame members for bay 12 include six horizontally-extending cylinder support members 20, each of which is approximately two inches longer than twice the diameter of the large gas cylinders to be stored therein. The six frame members 20 are disposed in two sets of three members, each set consisting of a lower member 21, a mid-height member 23, and an upper member 25. The rearward ends of each of the frame members 20 are engaged to rearward vertical support members 22, and the frontward ends of the frame members 20 are engaged to frontward vertical support members 24. The rearward vertical support members 22 are joined together by three horizontally disposed rearward frame members 26, each of which members 26 has a length which is approximately three inches longer than the diameter of a large cylinder. The three rearward frame members 26 are disposed as a lower member 27, a mid-height member 29, and an upper member 31, corresponding to the height of the frame members 21, 23 and 25. Floor mounting holes 19 are formed in the lower members 21 to permit the structure to be securely bolted to the floor utilizing bolts which project upwardly through the floor mounting holes 19.

The modular nature of the present invention permits the addition of additional support structures to hold additional gas cylinders. Such an additional support structure forming bay 16 is depicted in FIG. 1.

Bay 16 is shown as adapted for a single gas cylinder 14, shown in phantom. Thus, bay 16 is formed with three horizontally disposed frame members 28, each of which projects outwardly and parallel to frame members 20. The frame members 28 have a length which is approximately one inch greater than the diameter of a gas cylinder 14, and the three frame elements 28 are disposed in a lower 33, mid-height 35 and upper 37 frame member configuration which mimics the disposition of frame members 21, 23 and 25. The rearward ends of the frame members 28 are engaged to a vertically disposed rearward frame member 30 and the frontward ends of the frame members 28 are engaged to a vertically disposed frame member 32. Three horizontally disposed rearward frame members 34, each having a length that is approximately three inches greater than the diameter of the gas cylinder 14, serve to join the vertical frame member 30 to a vertical frame member 18. The frame members 34 are disposed in a lower 39, mid-height 41, and upper 43 configuration that mimics the disposition of rearward frame members 27, 29 and 31 of bay 12. Floor mounting holes 19 are formed in lower members 33 and 39 for anchoring the additional modular structures to the floor. When a bay such as 12 is two or more cylinders deep, floor mounting holes 19 are formed only in the lower members 27, however where a bay such as 16 is one cylinder deep the floor mounting holes are formed in a side member 33 and rear member 39. The modular nature of the present invention contemplates the joinder of additional support structures to create still further bays for holding gas cylinders.

It is also to be realized that the gas cylinder bays created by the frame members of the present invention are not to be limited to only one or two cylinders deep. By extension of the forwardly extending frame members 20 and 28 to lengths that are multiples of a cylinder diameter plus approximately one inch, cylinder bays for three cylinders are easily created and are within the contemplation of the modular structure of the present invention.

Lengths of chain 36 are engaged by welding of links to the mid-height 23, 35 and upper 25, 37 forwardly-extending frame members of sets 20 and 28 and the upper ends of vertical members 24 and 32 at particular locations. These locations are at distances equaling one cylinder diameter plus approximately one inch, such that chains 36 may be connected between various corresponding horizontally disposed pairs of eyelets 38, whereby said chains act to hold the gas cylinders in vertical orientation within the bays of the support structure 10. Cylinder holding brackets 210, described in detail herein, may be joined to the horizontal members 20, 28 at suitable locations to further engage gas cylinders disposed within the device 10.

The modular support structure of the present invention also includes fire barriers 40 which are engageable to the frame structure 10 utilizing brackets 42. The brackets 42 are bolted to the wall 40 and are dimensioned to tightly though removably engage the frame elements to which they are adapted. In the preferred embodiment the fire walls 40 are sections composed of four layers of one-half inch thick gypsum board having steel reinforcements along the bottom edge and sheet metal welded to the outer surface thereof. The wall elements 40 are utilized to separate support structures 10 containing bays having cylinders of incompatible chemicals. Thus, on the reverse side of walls 40 (not shown) may be disposed similar support structures to that shown in FIG. 1 which are utilized to store gas cylinders having incompatible chemicals. It is therefore to be realized that the frame structure may be laterally extended to include a plurality of bays 12 or 16 containing chemically similar gas cylinders of various sizes disposed in holding devices as are described hereinafter, and that groups of chemically dissimilar gas cylinders are to be separated by fire barriers 40.

Figure 2:
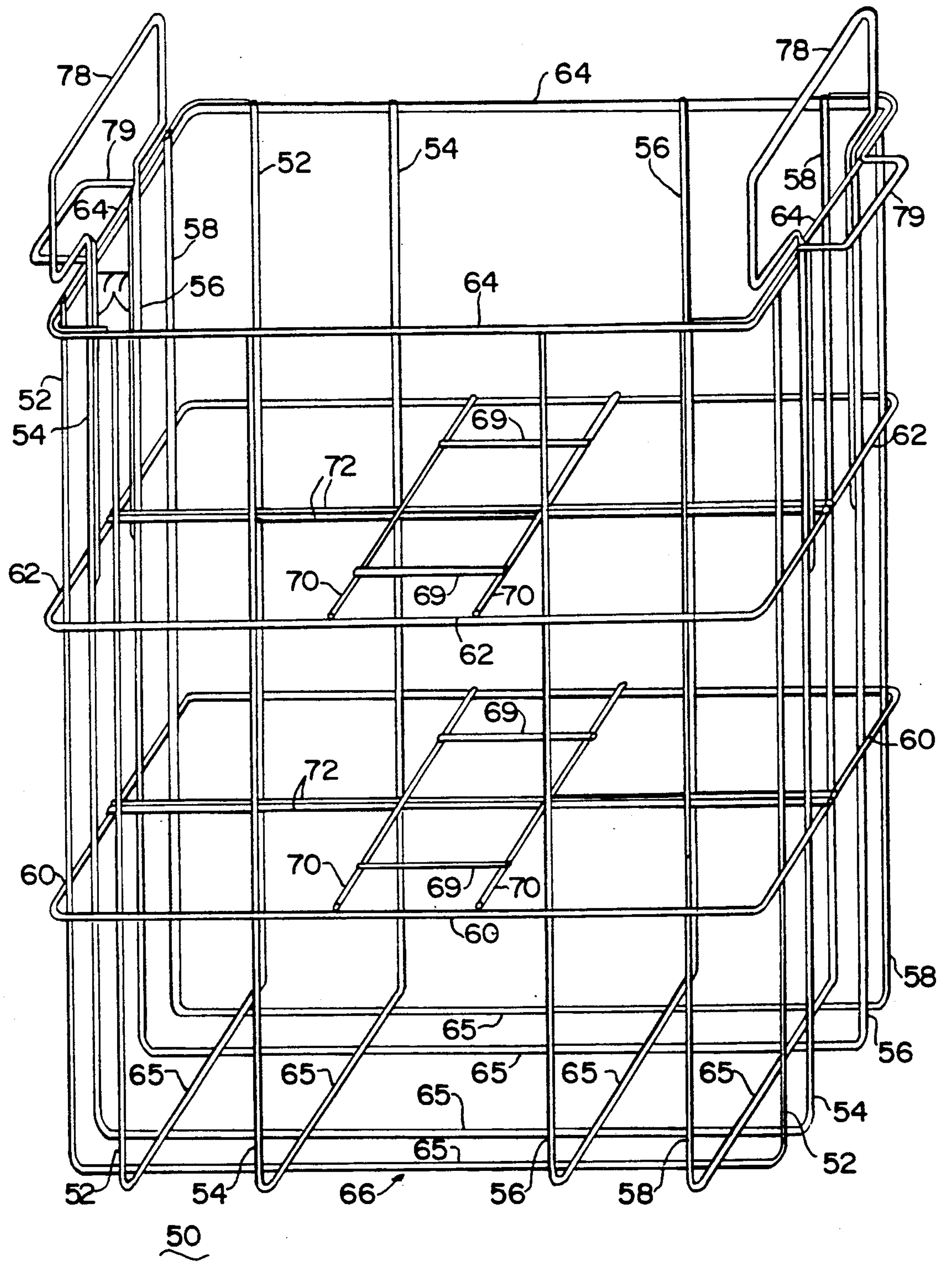
FIG. 2 is a perspective view of a cylinder-holding basket of present invention.
Figure 3:
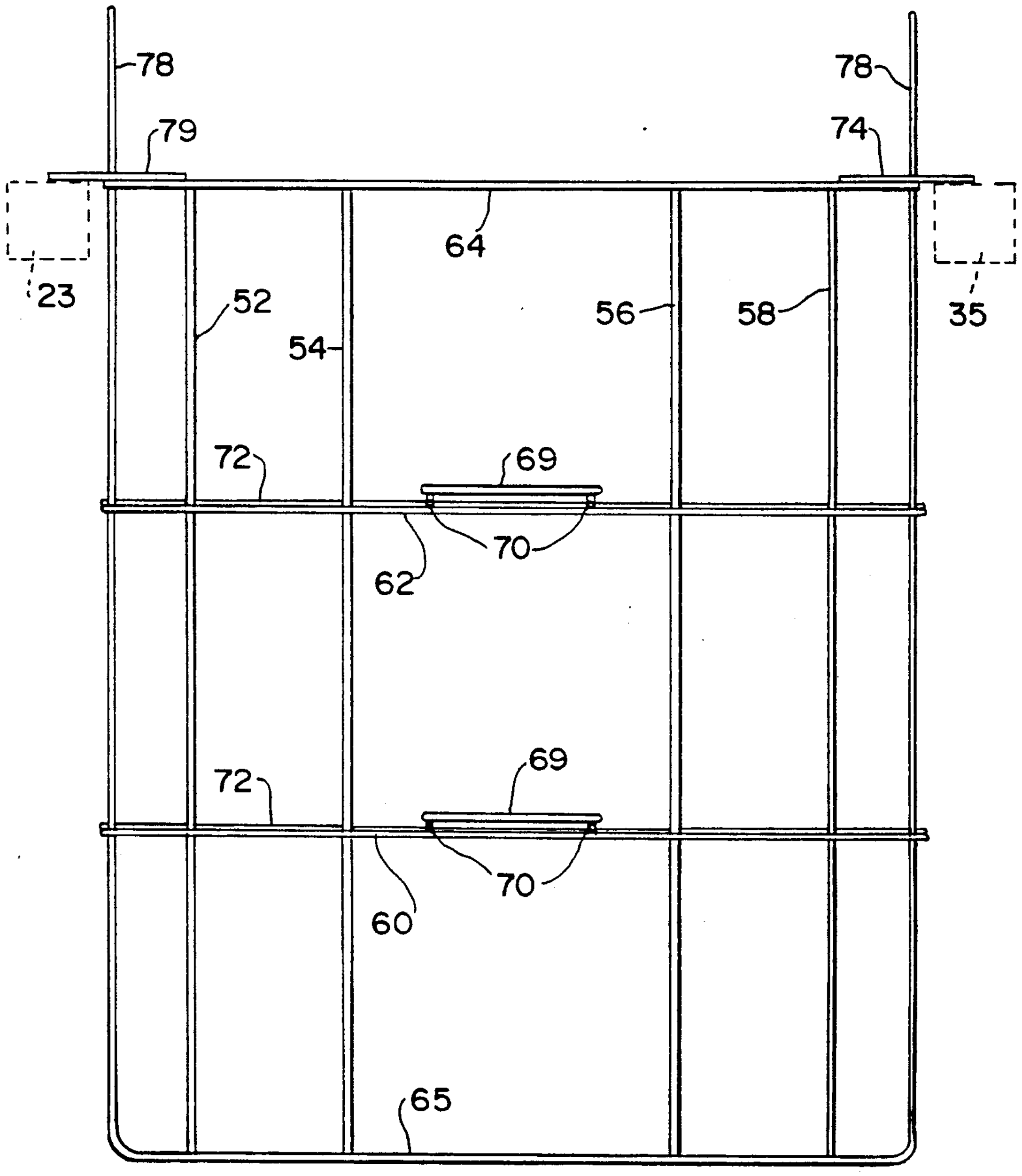
FIG. 3 is a front elevational view of the basket depicted in FIG. 2.
Figure 4:
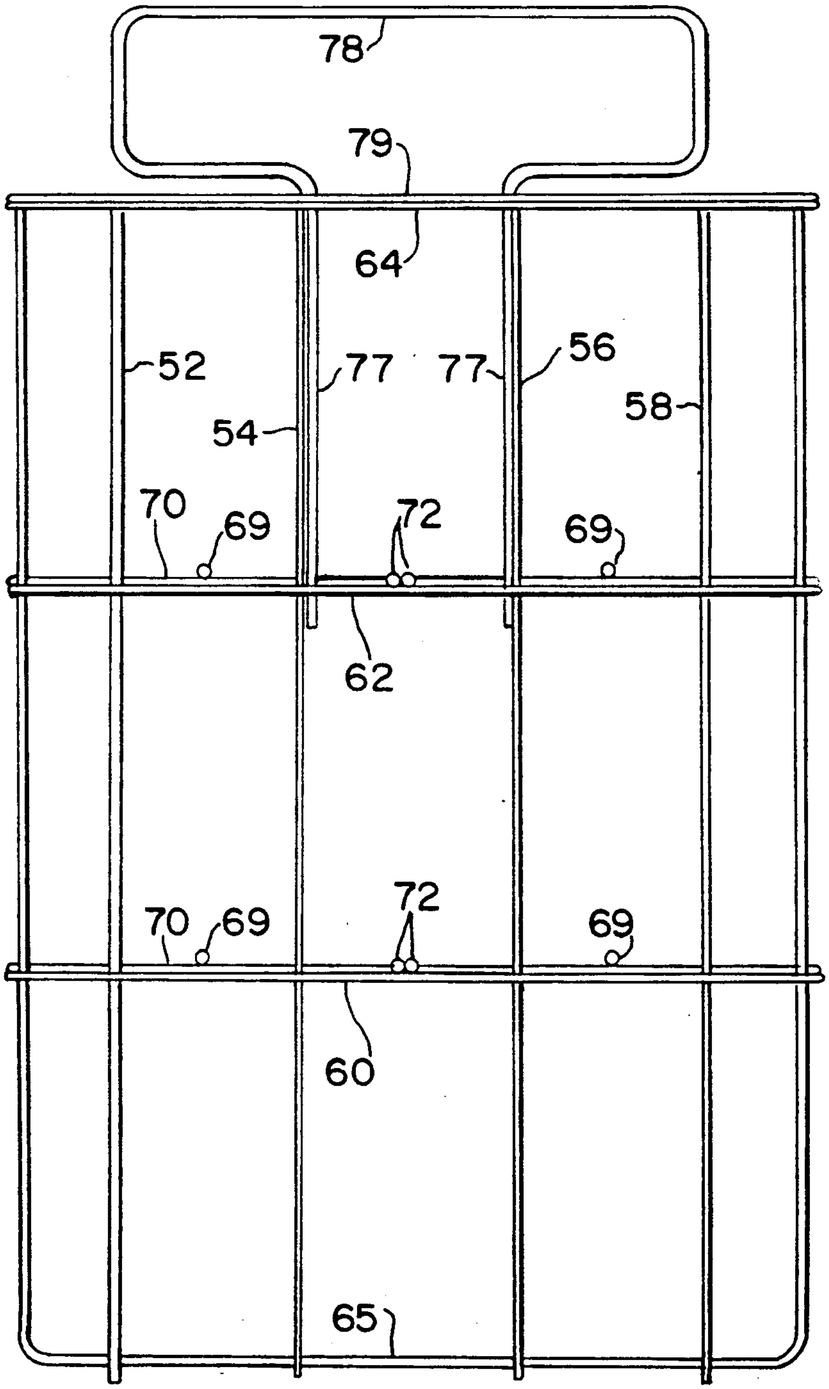
FIG. 4 is a side elevational view of the basket depicted in FIG. 2.
Figure 5:
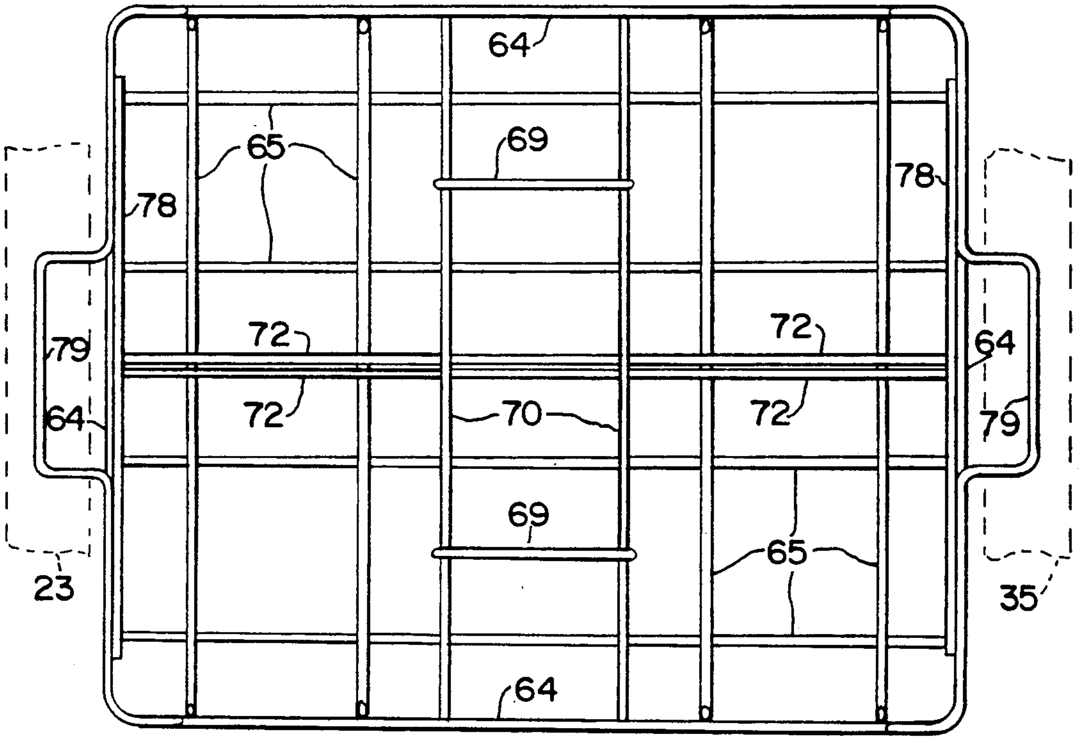
FIG. 5 is a top plan view of the basket depicted in FIG. 2.

FIG. 2 is a perspective view of a basket configuration for storing smaller gas cylinders; other views of this basket are presented in FIGS. 3-7. The basket depicted in FIGS. 2-7 is formulated from heavy-gauge wire and is dimensioned to snugly fit within and engage the frame members of a cylinder bay of the support structure 10, such as bay 16. Basket 50, as depicted in FIGS. 2 through 7, is formed from four substantially similar vertical faces (front, back, left side and right side) and four horizontally-disposed levels (top, upper, lower and bottom). The faces and levels are established through the vertical and horizontal orientations of the wires which make up the basket. As depicted in FIGS. 2, 3 and 4, the plane of each of the four faces is established by four vertical wire segments 52, 54, 56 and 58 and three horizontal wire segments 60, 62 and 64. The four vertical wire segments are not disposed equidistantly across the face, but rather are disposed in two pairs, such that wires 52 and 54 are spaced relatively close together as a pair and wires 56 and 58 are likewise spaced together relatively closely as a pair. A relatively large centrally disposed space is formed between the two pairs of wires.

The horizontally disposed wire segments 60, 62 and 64 are equidistantly disposed across the height of the face; however, the bottom level does not have a horizontal wire segment in the plane of the face.

The vertically disposed wire segments 52, 54, 56 and 58 are fixedly engaged, such as by welding, to the horizontally disposed wire segments 60, 62 and 64 at each junction thereof.

As is seen from FIG. 2, the topmost horizontal wire segment 64 of each face is preferentially formed as a single square wire segment having its two ends joined together at the juncture thereof. Likewise, the mid-level and lower level wire segments 62 and 60 are also preferentially formed from a single wire segment that is formed as a square and joined together at its two ends.

As is best seen in FIG. 2, the vertical wire segments of opposing faces are preferentially formed from U-shaped wire elements, wherein the vertical legs such as 52 of the "U" shape are disposed in the plane of the opposite faces and the base portion, such as 65, of the "U" shape is disposed in the bottom level of the basket 50. As appears most readily from FIGS. 2 and 7, the bottom level 66 is defined by the criss-cross intersection of the base portions 65 of the eight U-shaped elements, said base portions being fixedly joined one to another at the various intersections thereof, such as by welding.

Figure 6:
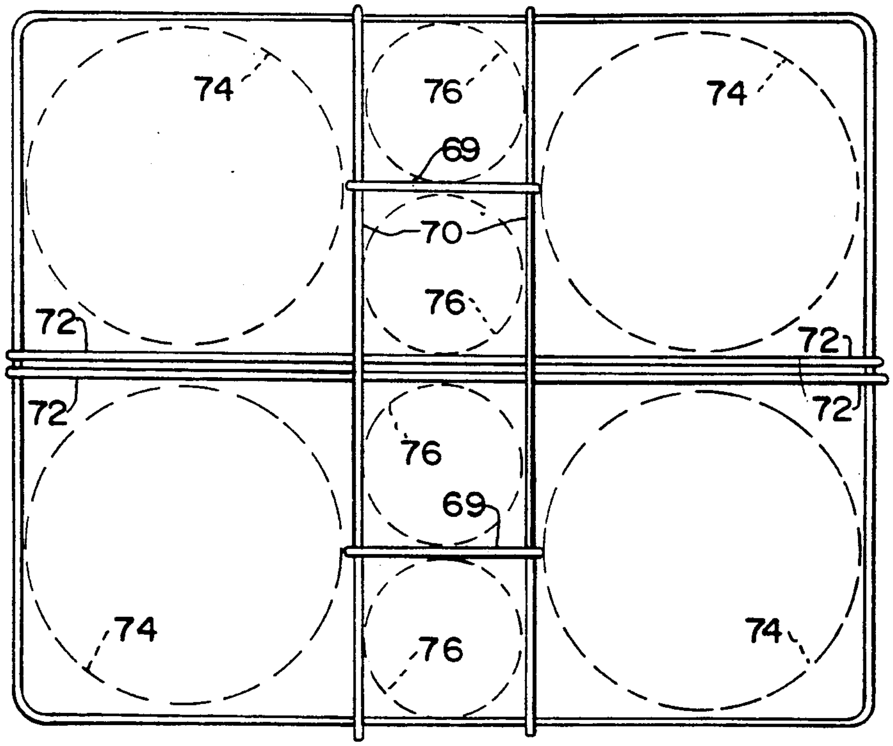
FIG. 6 is a top plan view of the lower level of the basket depicted in FIG. 2.

The lower horizontal level, defined by the square formed by horizontal segments 60, includes six wire segments disposed in the plane of the level 60. As is best seen in FIG. 6, four of the six segments are arranged in two pairs 70 and 72, and the remaining two wire segments 69 are each engaged between the two wires of pair 70. The wire segments of one pair 70 are engaged perpendicularly to the wire segments 60 of opposing faces; likewise, the two wire segments of pair 72 are engaged perpendicularly to the wire segments 60 of the remaining two opposing faces. The pair of wire segments 70 are laterally spaced relative to the engagement with wire segments 60 such that substantially less than one third of the length of wire segment 60 resides between the engagement points of the pair of wire segments 70 to the wire segment 60. As depicted in FIG. 2, it is to be understood that the upper level, defined by wire segments 62, includes six wire segments that are disposed in a similar manner to the wire segment pairs 70 and 72 and wire segments 69 disposed in lower level 60. The top-most level 64 is defined by wire segments 64. As depicted in FIG. 2, there are no pairs of wire segments corresponding to pairs 70 and 72 and 69 disposed within the top-most level 64.

Figure 7:
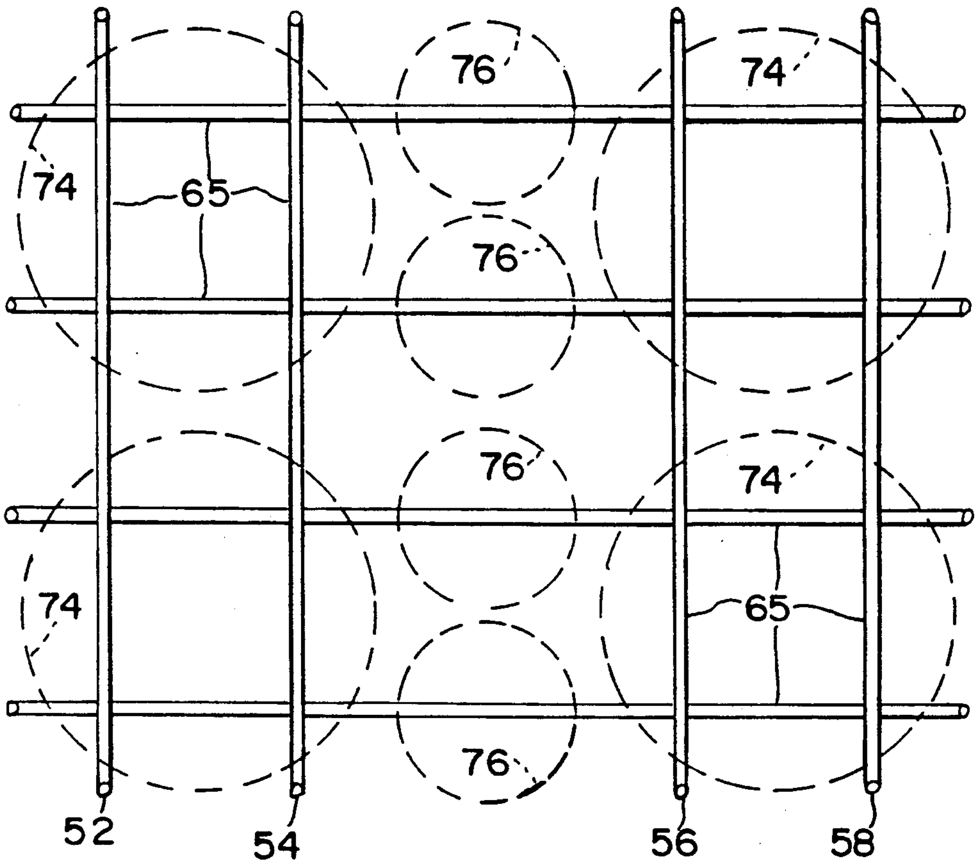
FIG. 7 is a top plan view of the bottom level of the basket depicted in FIG. 2.
Figure 8:
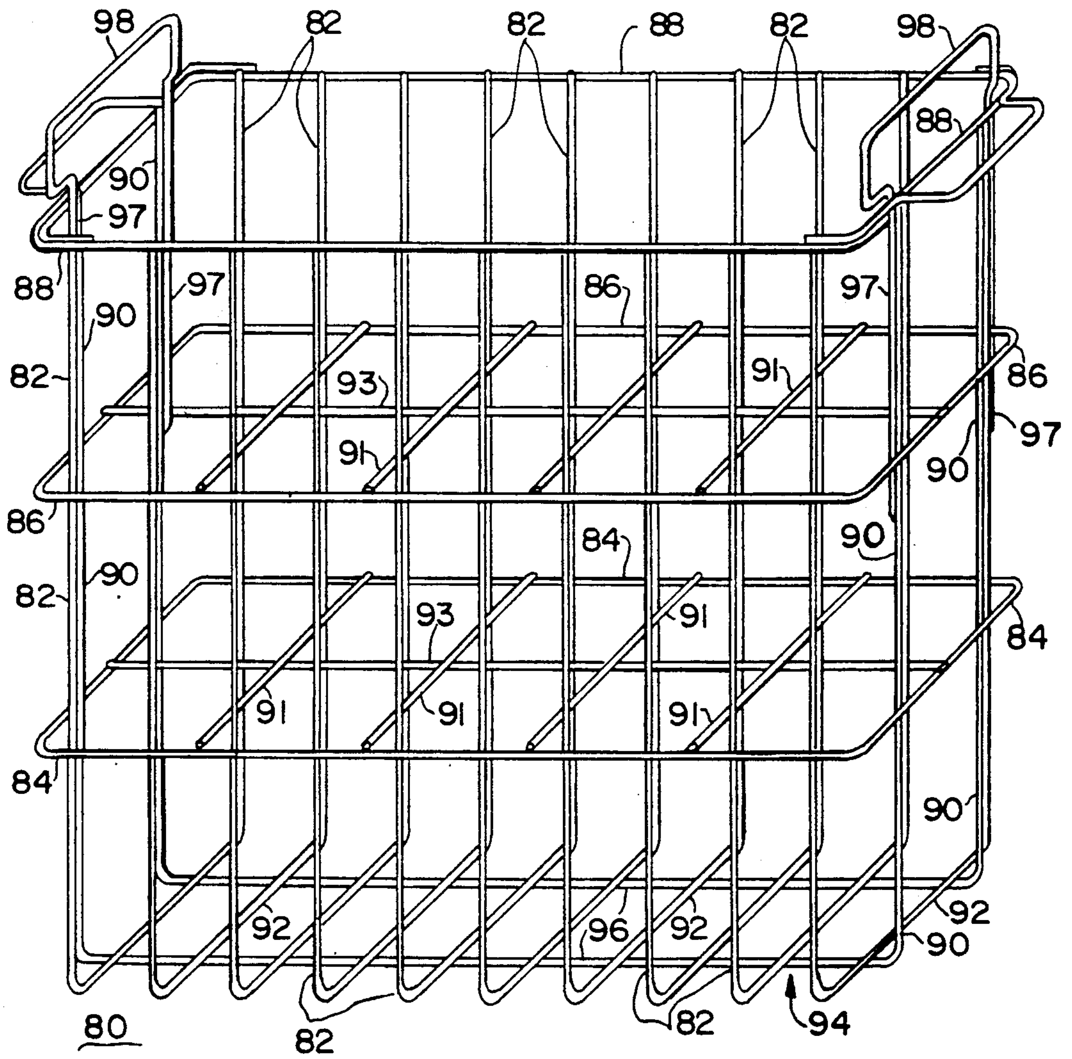
FIG. 8 is a perspective view of another gas cylinder basket of the present invention.

The placement of cylindrical gas cylinders within the basket 50 is depicted in FIGS. 6 and 7, wherein the cylindrical cylinders are shown in top view as circular traces in phantom. Each of the larger cylinders 74 is supported by segments of the base portions 65 of four of the U-shaped elements, such that four engagement points are disposed beneath each cylinder 74. Lateral support for the cylinders 74 is provided at the lower and upper levels by portions of the interior wire segment pairs 70 and 72. Two smaller gas cylinders, shown in top view as a circular trace, in phantom, in FIGS. 6 and 7, may be disposed between the pairs of wire segments 70. Each of the smaller cylinders 76 is supported from below by a segment of a base portion 65 of a U-shaped wire segment. The wire segments 69 serve to separate the pairs of two smaller gas cylinders 76 that are disposed between the wire pairs 70.

To facilitate the carrying and handling of the basket 50 a handle 78 is engaged to two opposing side faces. As is best depicted in FIG. 4, the handle 78 is formed from wire segments having leg portions 77 which are welded in parallel relationship to the wire segments 54 and 56. The hand hold portions of handles 78 are bent outwards to create a large handling portion to facilitate ease of manipulation.

It will therefore be appreciated that basket 50 is formulated to hold four mid-size gas cylinders and four smaller gas cylinders in an accessible yet secure manner. The basket 50 is sized relative to the support structure 10 such that all of the cylinders within such a basket may be further disposed within a bay such as 12 or 16 of the rack depicted in FIG. 1, and secured by having a chain disposed in front thereof to securely hold the basket within the rack. To further facilitate the engagement of basket 50 within a bay 12 or 16 of the device 10, horizontally projecting frame engagement wire members 79 are welded to the top wire segment 64 on each side of the basket 50. Each frame engagement member 79 is formed to engage corresponding horizontal frame members such as 23, 35 or 25, 37 of the frame described hereinabove. Frame members 23 and 35 are shown in phantom in FIGS. 3 and 5 to illustrate the engagement of basket 50 within a bay such as bay 16.

Figure 9:
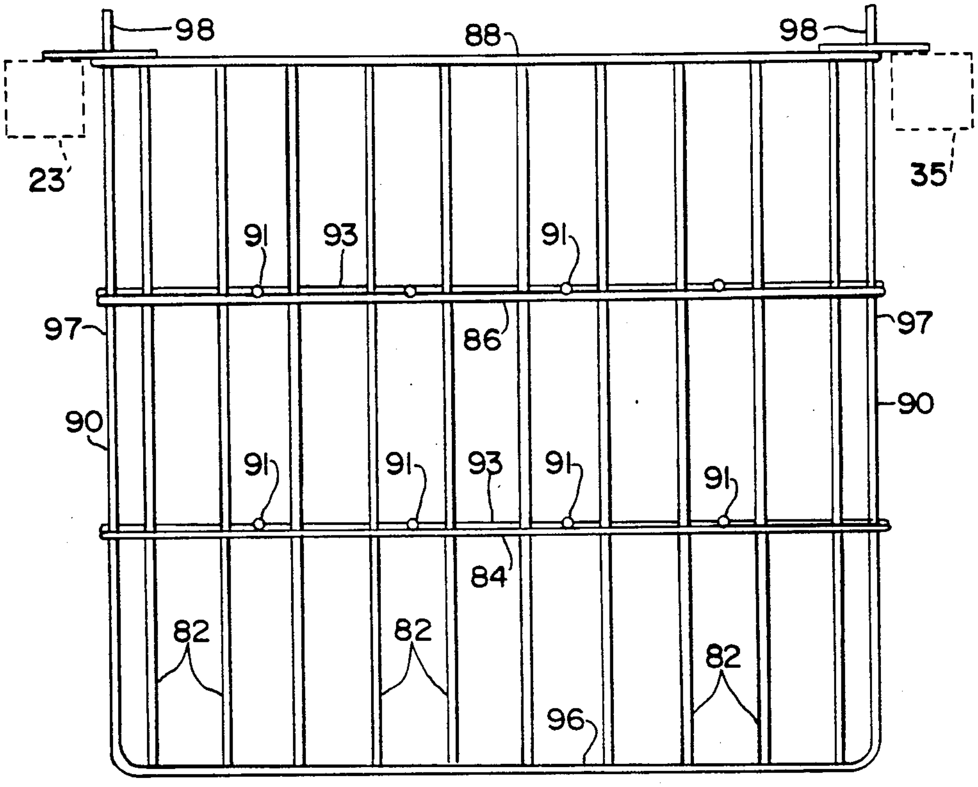
FIG. 9 is a front elevational view of the basket depicted in FIG. 8.
Figure 10:
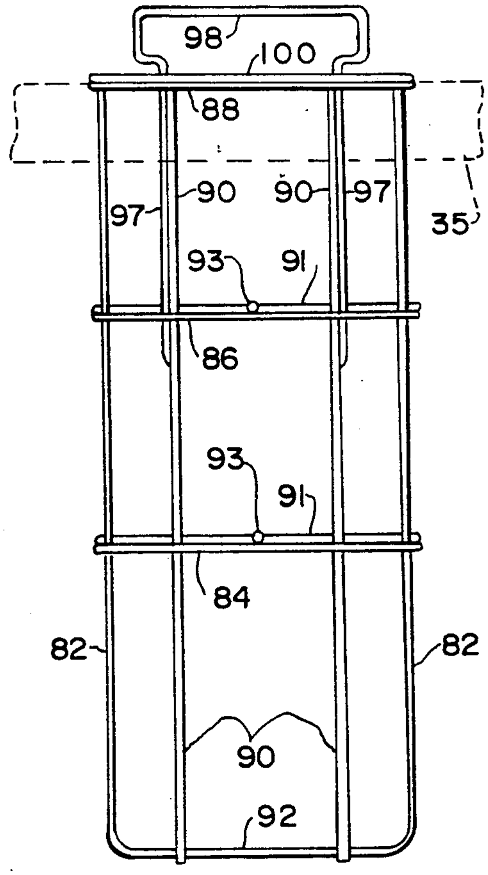
FIG. 10 is a side elevational view of the basket depicted in FIG. 8.

FIGS. 8, 9, 10, 11, and 12 depict a wire basket 80 of the present invention that is suitable for holding 10 smaller cylinders. The front face and rear face of the basket 80, as depicted in FIG. 9, are formed from ten vertical wire segments 82 and three horizontal wire segments 84, 86 and 88, which serve to define front and rear planar surfaces. The two side faces, as depicted in FIG. 10, are defined by two vertical wire segments 90 and three horizontal wire segments 84, 86 and 88. In the preferred embodiment, as shown by the top view of lower level 84 depicted in FIG. 11, the horizontal wire segments 84 are preferably formed as a single rectangular wire segment which is joined together at the ends thereof; likewise, upper level 86 and top level 88 are each preferably formed from a single rectangularly shaped wire segment which is joined together at its ends. The vertical wire segments 82 are preferably formed from U-shaped wire elements having vertical leg portions 82 and horizontal base portions 92. The base portions 92 define the plane of the bottom level 94 of the basket 80, see FIG. 12. Likewise, the vertical segments 90 of the side portions of the basket 80 are preferably formed from U-shaped wire elements, wherein the wire segments 90 comprise the leg portions of the U-shaped element and the base portion of the U-shaped element comprises the horizontally disposed wire segment 96 formed in the bottom level 94 of the basket 80.

Figure 11:
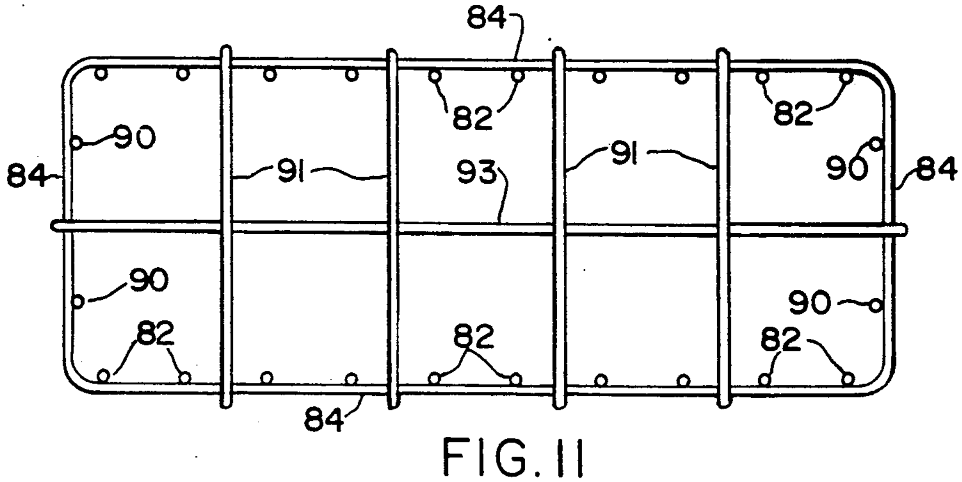
FIG. 11 is a top plan view of the lower level of the basket depicted in FIG. 8.

Both the lower level, defined by wire segments 84, and the upper level, defined by wire segments 86, are divided into ten gas cylinder holding bays. The division is accomplished, as depicted in FIG. 11, utilizing four wire segments 91 which are welded at their ends to wire segments 84 in the front and rear planes of the basket 80 and one wire segment 93 which is welded at its ends to the wire segments 84 disposed in the side planes of the basket 80. The wire segments 91 are equally spaced across the length of wire segment 84 such that gas cylinder bays of equal size are created.

Handles 98 for the basket 80 are formulated from wire segments having leg portions 97 which are welded in parallel relationship to the wire segments 90 in the sides of the basket 80. The hand hold portions of the handles 98 are bent outwards to create a large handling portion to facilitate ease of manipulation.

The basket 80 is dimensionally configured to fit snugly between the horizontally projecting frame members 23, 35 or 25, 37 of the support structure 10 depicted in FIG. 1. To facilitate the engagement of basket 80 within frame structure 10, a frame engaging member 100 projects laterally from each side of basket 80 proximate the joinder of handle 98 with the top-most level 88 of the basket 80. The frame engaging member 100 is configured as a horizontally disposed structure that is welded to the upper surface of top wire segment 88. Frame members 23 and 35 are shown in phantom in FIGS. 9 and 10 to illustrate the engagement of basket 80 within a bay such as bay 16. It is therefore to be appreciated that the basket 80 when placed within a bay 16 of the support structure 10 will be engaged therewithin such that the laterally extending members 100 from each side of the basket 80 will enable the basket 80 to rest upon and engage the horizontal projecting frame members 23 and 35 of the support structure 10.

Figure 12:
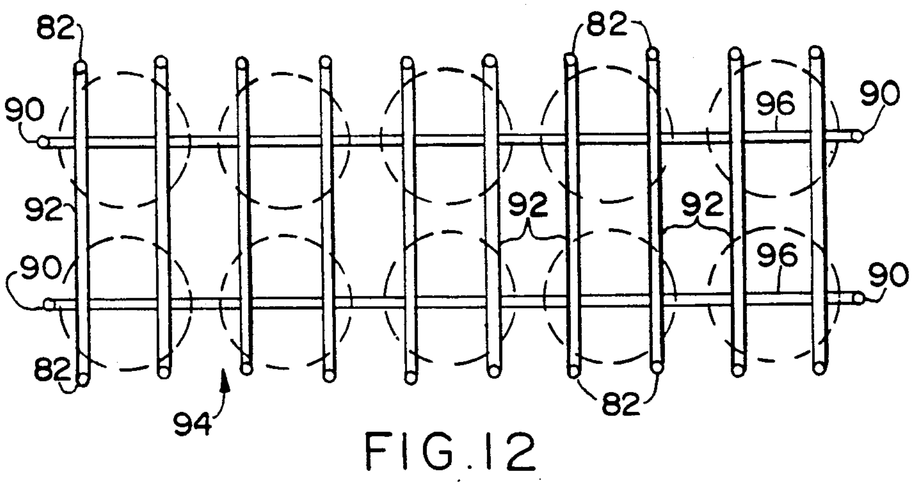
FIG. 12 is a top plan view of the bottom level of the basket depicted in FIG. 8.

As is best seen in FIG. 12, ten cylindrical gas cylinders, shown in top view as circular traces in phantom, may be disposed within basket 80 in two rows of five cylinders each. The wire structure of basket 80 is formulated such that each cylinder will be supported from below with two base segments 92 of the U-shaped wire elements 82 and a portion of one base member 96 of U-shaped wire elements 90. Each of the cylinders in basket 80 is therefore securely supported from below by the wire segments which make up the basket.

Figure 13:
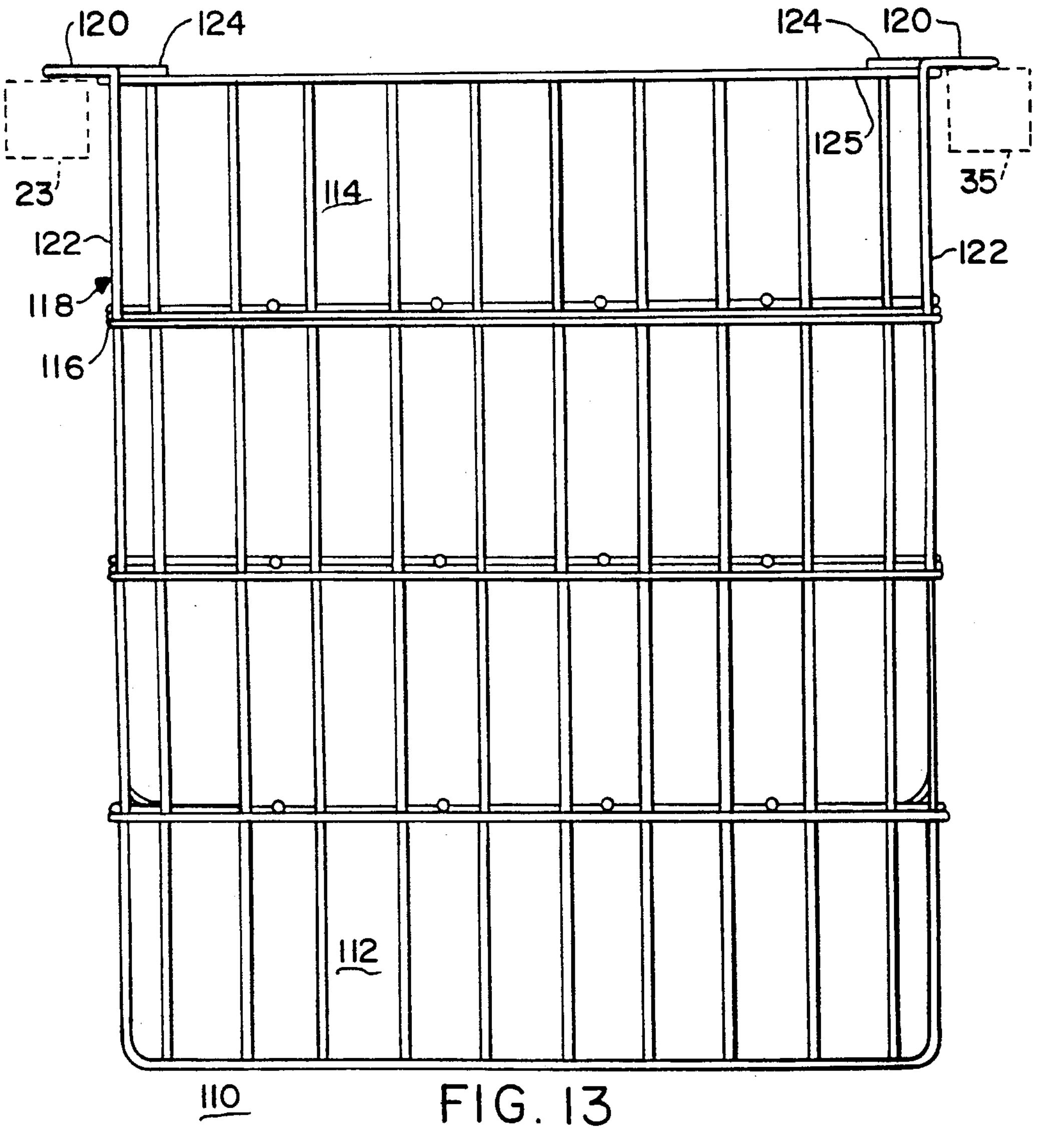
FIG. 13 is a front elevational view of a two-basket configuration.
Figure 14:
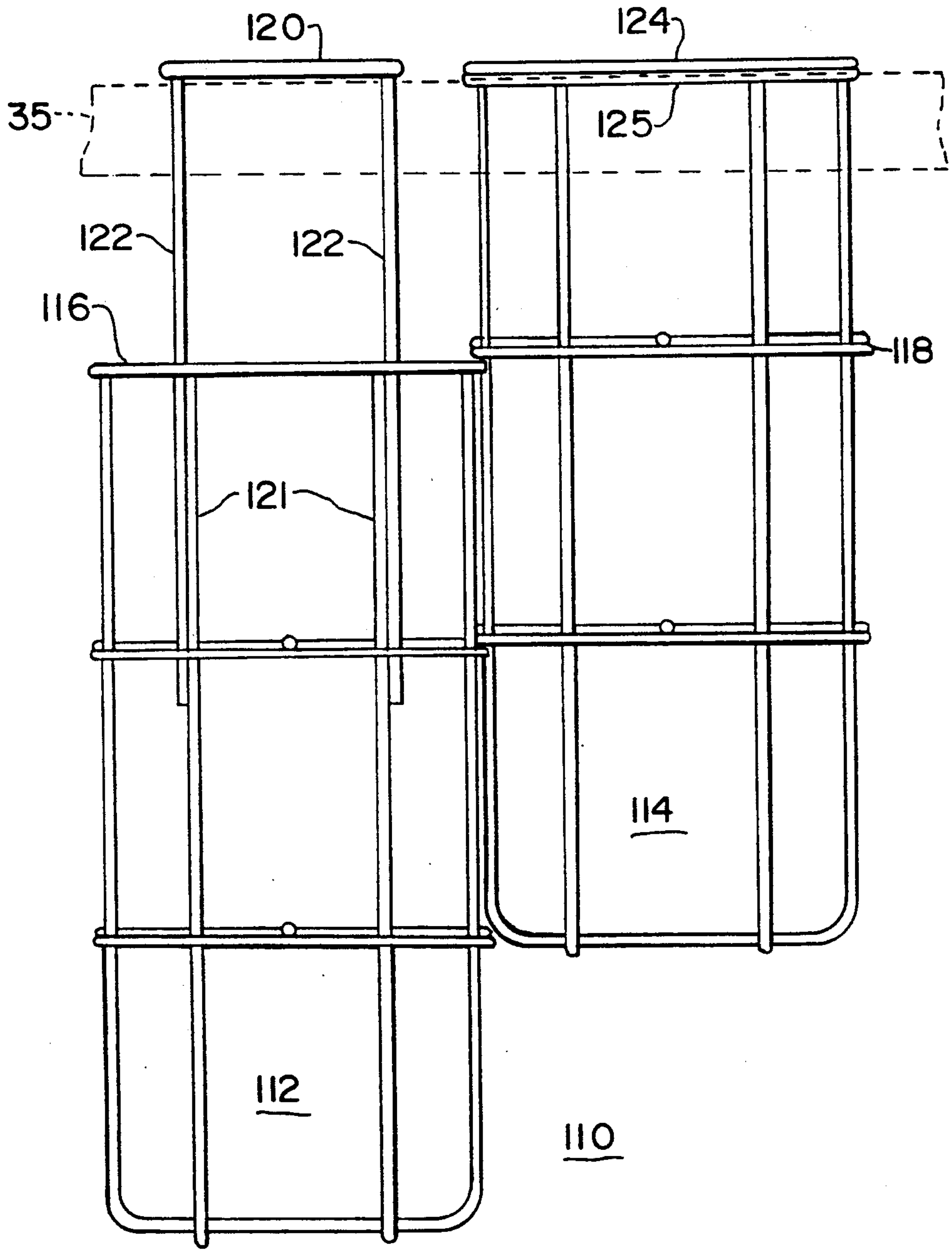
FIG. 14 is a side elevational view of the two-basket configuration depicted in FIG. 13.

A two-level basket configuration 110 is depicted in FIGS. 13 and 14. As is best seen by comparing FIG. 10 and FIG. 14, the two-basket configuration 110 basically comprises two baskets 112 and 114 each of which is similar in design to basket 80 of FIG. 10. The two baskets 112 and 114 are joined together, such as by welding the corresponding wire members thereof, such that the top level 116 of basket 112 is horizontally disposed next to the upper level 118 of basket 114. The juxtaposition of the two baskets in this manner permits gas cylinders disposed within basket 114 to project higher than similar gas cylinders disposed in basket 112. This two-basket configuration thus permits easier access to the gas cylinders disposed within the baskets. As is best seen in FIG. 14, basket 112 is formed with a frame engaging wire segment 120 having vertically depending leg sections 122 which are welded in parallel relationship to wire elements 121 that correlate to the wire elements 90 of basket 80 depicted in FIG. 10. A frame engaging member 124 is welded to the top segment 125 of basket 114 in a similar manner to frame engaging element 100 of basket 80. The two horizontally-projecting frame engaging members 120 and 124 are horizontally aligned to permit the two-basket device 110 to fit within the support structure 10 depicted in FIG. 1, such that the two horizontally-extending frame engaging members 120 and 124 will each engage the same laterally-extending frame member 23, 35 or 25, 37 of the support structure 10 when the basket 110 is disposed within a bay 16 of the support structure 10. Frame members 23 and 35 are shown in phantom in FIGS. 13 and 14 to demonstrate the engagement of basket 110 within bay 16.

Figure 15:
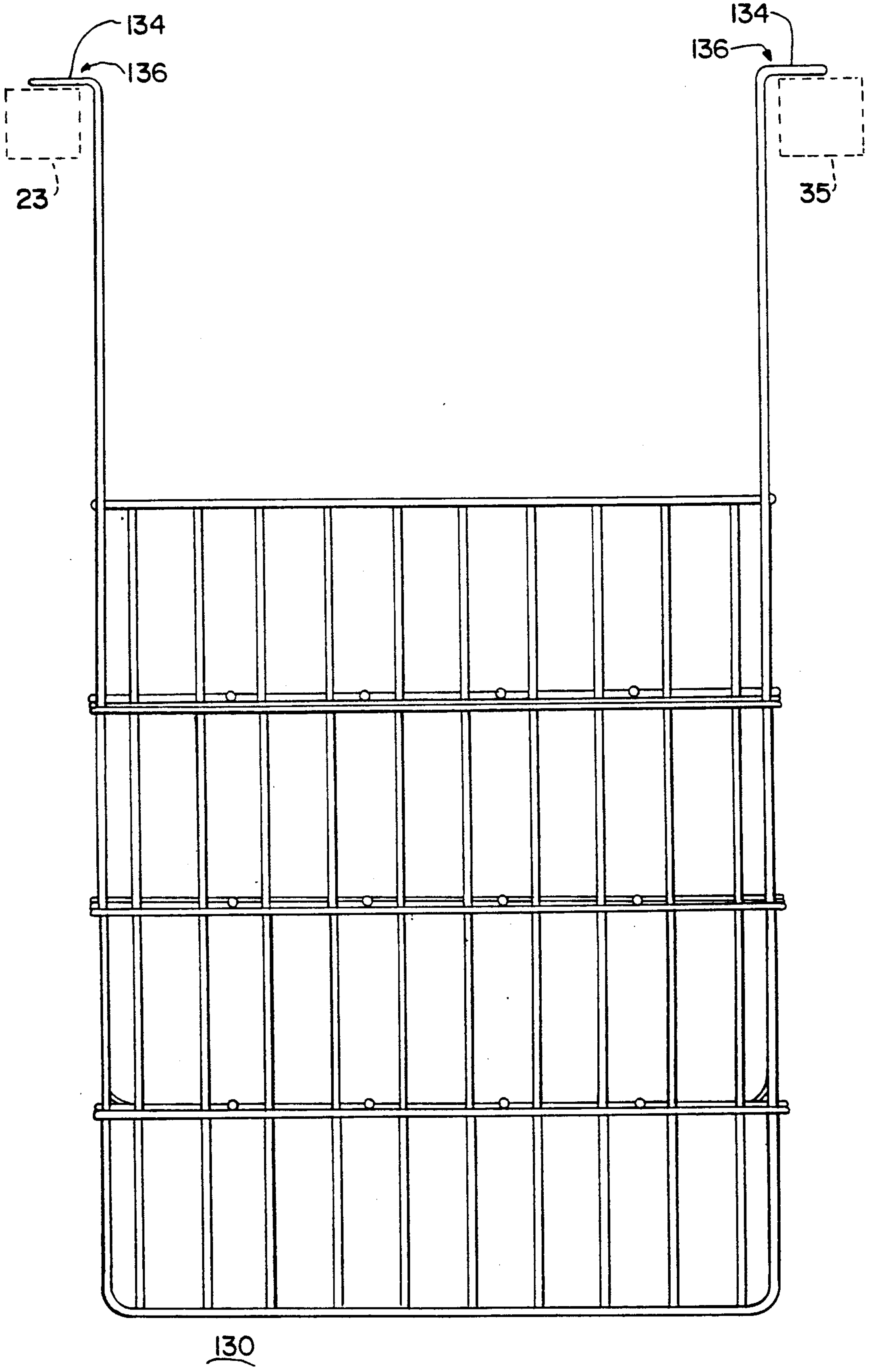
FIG. 15 is a front elevational view of another two-basket configuration.
Figure 16:
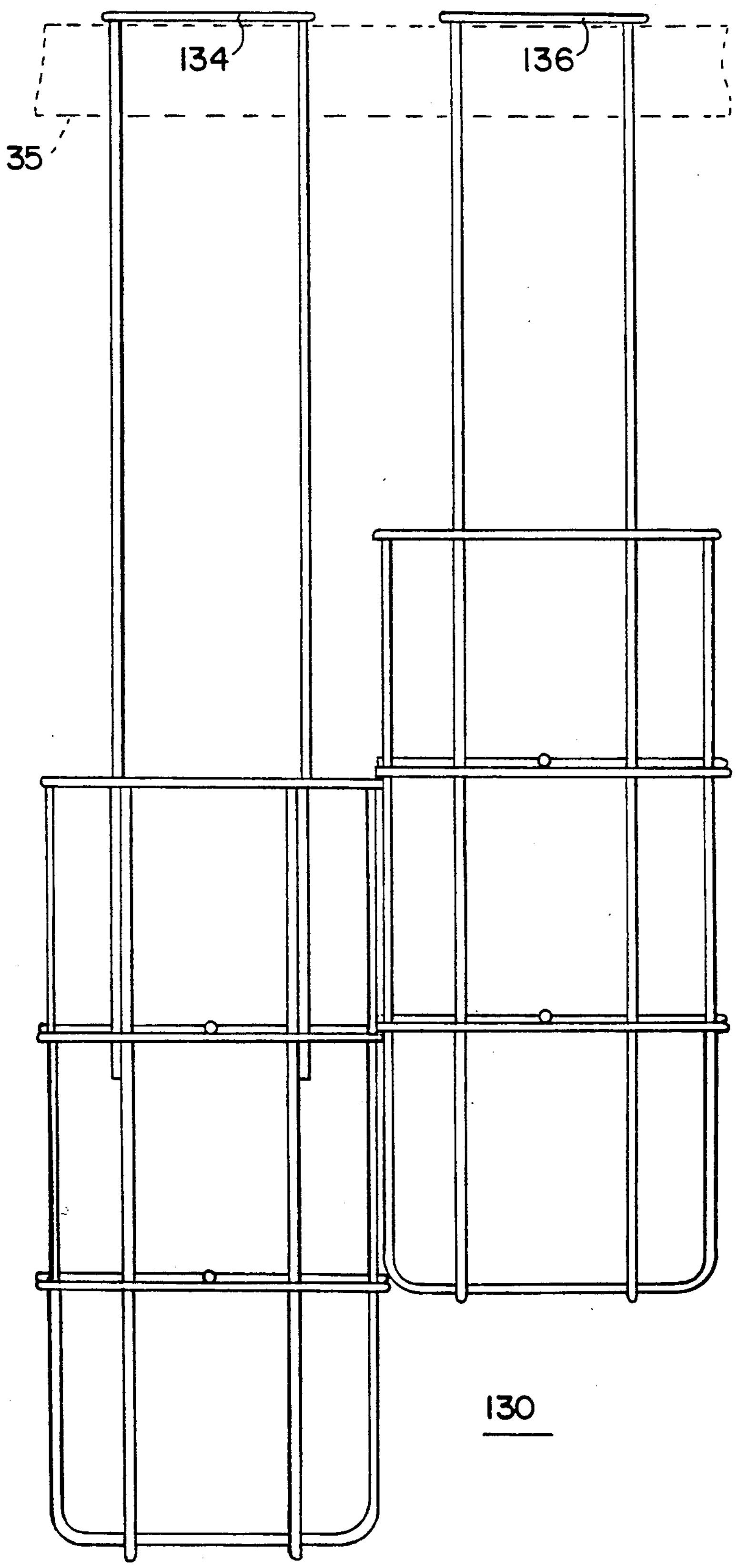
FIG. 16 is a side elevational view of the two-basket configuration depicted in FIG. 15.

Another two-basket cylinder-holding device 130 is depicted in FIGS. 15 and 16. As is best seen by comparing FIG. 16 and FIG. 14, the device 130 of FIG. 16 is similar to the device 110 of FIG. 14. The significant difference between the two devices 110 and 130 is the vertical extension of the frame engagement members 134 and 136 of the two baskets of the device 130 depicted in FIG. 16. As with members 120 and 124 of basket 110, the laterally-projecting members 134 and 136 are formed to engage a laterally-projecting frame member 23 and 35 of support structure 10 when the device 130 is disposed within a bay 16 of support structure 10. It is therefore to be realized that when device 110 is placed within a bay 16 such that the frame engaging members 122 and 124 rest upon projecting frame members 23 and 35, and basket 130 is thereafter disposed within the same bay 16 such that its frame engaging members 134 and 136 are engaged upon the same frame members 23 and 35 that a four-level cylinder-holding basket arrangement will be created. Each level of the four-level arrangement will hold ten cylinders and the four-level arrangement will permit easy access to any of the cylinders.

Figure 17:
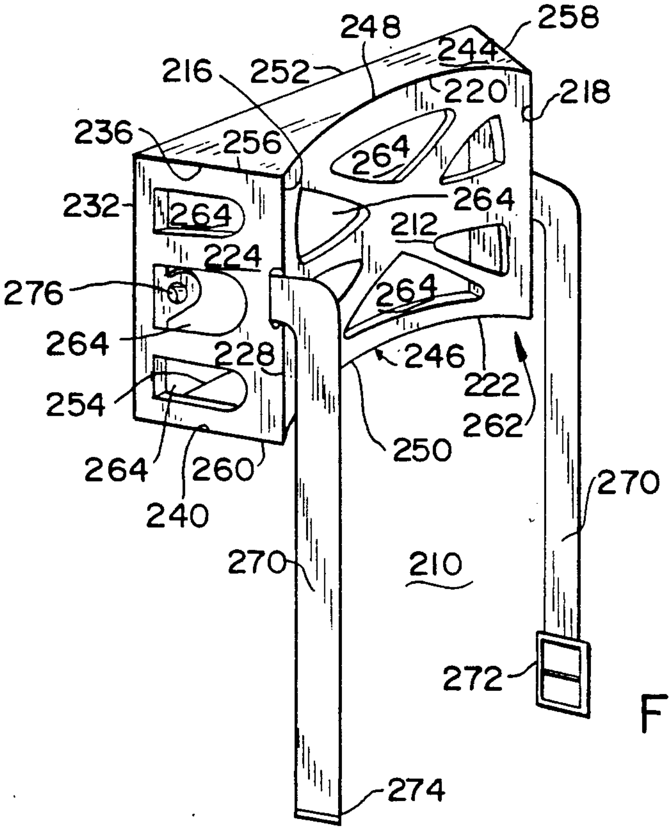
FIG. 17 is a perspective view of the gas cylinder storage bracket of the present invention.
Figure 18:
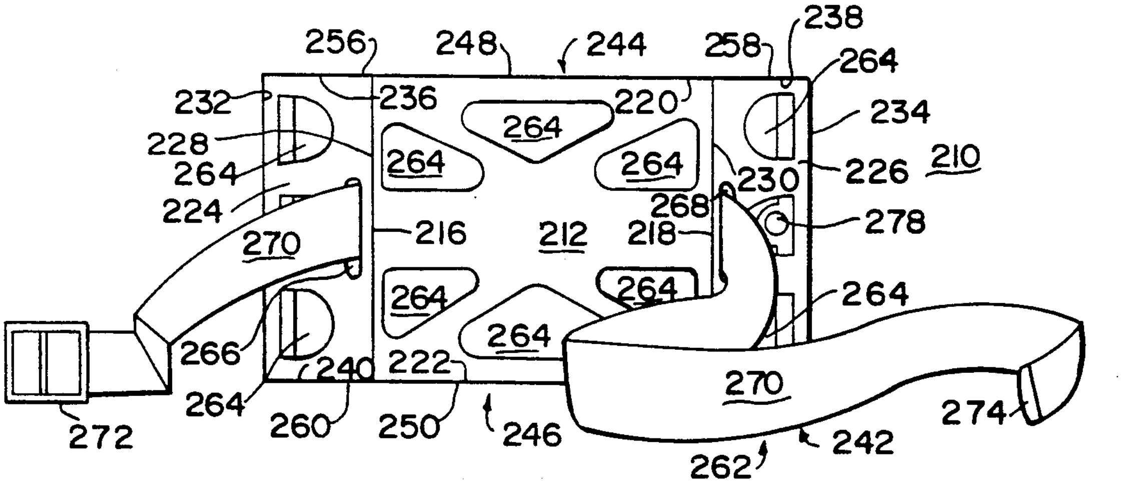
FIG. 18 is a front elevational view of the bracket depicted in FIG. 17.
Figure 19:
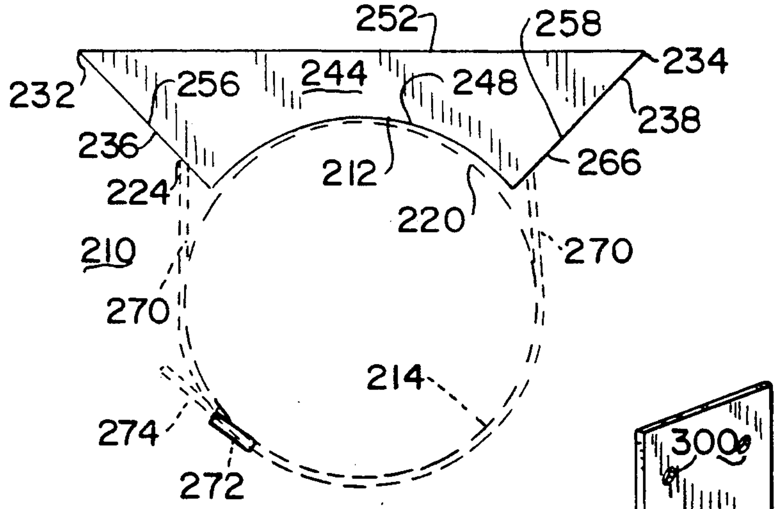
FIG. 19 is a top plan view of the bracket depicted in FIG. 17.

As depicted in FIGS. 17, 18, and 19, the cylinder bracket 210 of the present invention includes a front face 212 that is formed as a concave surface for mating engagement with the outer curved surface of a gas cylinder 214 shown in phantom in FIG. 19. Front face 212 is bounded by two lateral edges 216 and 218 and a curved top edge 220 and a curved bottom edge 222. Two side faces 224 and 226, being basically rectangular in configuration, extend rearwardly and outwardly from the lateral edges 216 and 218 respectively of the front face 212. Each side face 224 and 226 is bounded by a frontal edge 228 and 230 respectively, a rearward edge 232 and 234 respectively, a top edge 236 and 238 respectively, and a bottom edge 240 and 242 respectively. Frontal edge 228 of side face 224 mates with lateral edge 216 of front face 212 in joining the side face 224 to the front face 212. Frontal edge 230 of side face 226 mates with lateral edge 218 of front face 212 in joining side face 226 to front face 212.

A top face 244 and bottom face 246 extend rearwardly from the top edge 220 and the bottom edge 222 respectively of the front face 212. Each of the top face 244 and bottom face 246 is bounded by a curved frontal edge 248 and 250 respectively (which mate with the curved top edge 220 and bottom edge 222 respectively of front face 212), a rearward edge 252 and 254 respectively, and two side edges 256 and 258 of the top face 244 and two side edges 260 and 262 of the bottom face 246. The side edges 256 and 258 of the top face 244 mate with the top edges 236 and 238 respectively of the side faces 224 and 226 respectively. The side edges 260 and 262 of the bottom face 246 mate with the bottom edges 240 and 242 respectively of the side faces 224 and 226 respectively.

Each of the faces of the bracket 210 is basically formed in a planar manner, such that the thickness of the face member is less than its other major dimensions, and such that the bracket 210 is basically hollow, rather than solid. The preferred embodiment of the bracket 210 is formed by casting as a single piece, whereby the strength of the joinder of the various faces with one another is assured. Spaces 264 may be formed at various locations in the various faces of the bracket 210 to conserve material, as long as the strength of the bracket 210 is not jeopardized.

Strap slots 266 and 268 are formed in the side faces 224 and 226 respectively to permit the passage of a cylinder strap 270 therethrough. The strap 270 is preferably formed with a quick-release buckle 272 on one end and a finished end 274 on the other end thereof. The strap 270 passes through the slot 266, behind the front face 212, and out the slot 268. As depicted in FIG. 19, the cylinder strap is utilized to pass around the gas cylinder 214 and hold the cylinder 214 securely to the front face 212 of the bracket 210. A bolt hole 276 and 278 is formed in the rearward edge 232 and 234 respectively of each of the side faces 224 and 226 respectively. The bolt holes 276 and 278 permit the bracket 210 to be attached to a frame member 20 or 28 of support structure 10, see FIG. 1 and FIG. 22, or a wall, as is discussed hereinafter.

Figure 20:
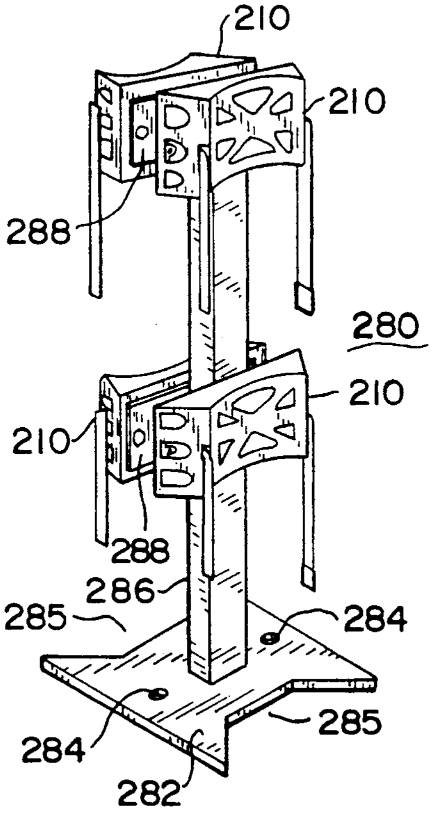
FIG. 20 is a perspective view of a two-cylinder stand utilizing the bracket depicted in FIG. 17.
Figure 21:
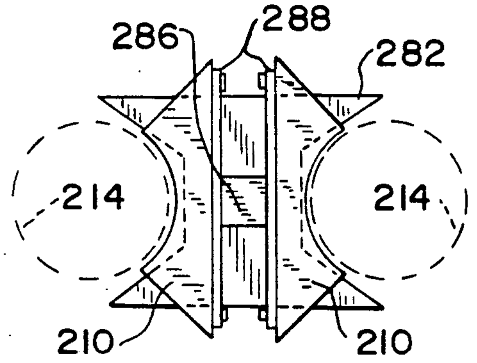
FIG. 21 is a top plan view of the device depicted in FIG. 20.

FIGS. 20 and 21 depict a cylinder stand of the present invention that is suitable for holding two cylinders in a vertical configuration. As depicted in FIGS. 20 and 21, the two-cylinder stand 280 of the present invention utilizes four cylinder brackets 210 as have been previously described. The two-cylinder stand 280 has a planar base plate 282 having two bolt holes 284 formed therethrough for bolting the base to the floor in a desired placement. A cylinder support bar 286 extends vertically from the base plate 282. The support bar 286 is preferably an elongated steel member that is square in cross-section. It is securely welded to the base plate 282 at its juncture therewith. A bracket mounting plate 288 is welded to bar 286 and utilized to join the bracket 210 to the bar 286. The mounting plate 288 is a flat, rectangular plate having bolt holes formed therethrough for alignment with the bolt holes 276 and 278 of bracket 210. In the preferred embodiment, two brackets 288 are welded to the top of the face of bar 286, see FIG. 21, to hold two upper cylinder support brackets 210 in position; two other brackets 288 are welded to bar 286 at the position of the lower cylinder support brackets 210. Base plate 282 is formed with cutout portions 285 to permit a mounted cylinder to stand fully on the floor.

Figure 22:
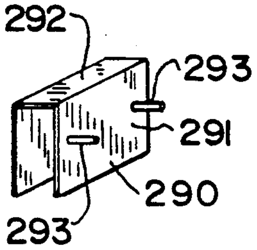
FIG. 22 is a perspective view of a mounting bracket for two cylinder storage brackets.

FIG. 22 depicts a mounting bracket 290 that is utilized to mount cylinder brackets 210 to horizontal bars, such as 23 or 25 of the support structure depicted in FIG. 1. The bracket 290 includes two rectangular plates 291 that are joined together through a top plate 292, to create a "U" shaped bracket 290 which is dimensioned to snugly fit over a support bar 23 or 25. Studs 293 are welded to plates 291 at locations which correspond to the mounting holes 276 and 278 formed in the cylinder bracket 210.

Figure 23:
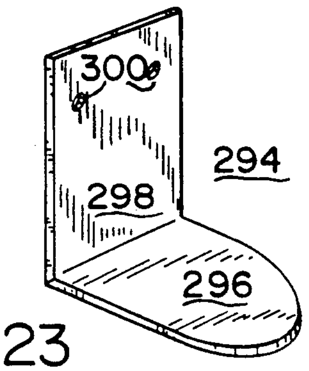
FIG. 23 is an L-bracket utilized with the device depicted in FIG. 17.
Figure 24:
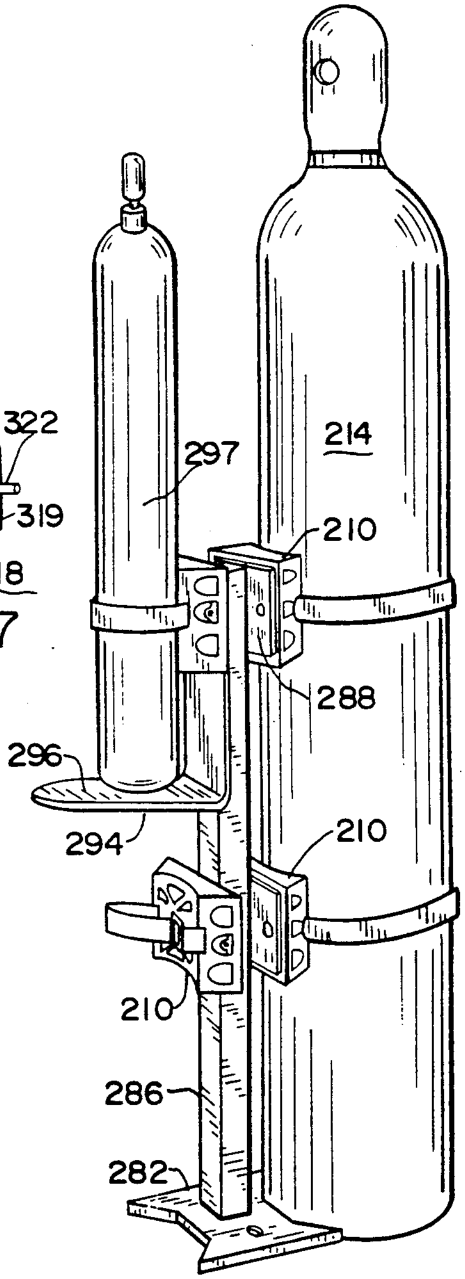
FIG. 24 is a perspective view of the utilization of the device depicted in FIG. 20.

FIG. 23 depicts an L-bracket which is utilized to support a small-sized cylinder when mounted utilizing the bracket 210. As is seen with the aid of FIG. 24, the L-shaped bracket 294 is formed with a horizontally-projecting platform 296 which supports the base of a short cylinder 297, and a vertically-projecting back plate 298 through which two mounting holes 300 are formed. The mounting holes are placed such that they may be aligned with the mounting holes 276 and 278 of the bracket 210. As is shown in FIG. 24, the L-shaped bracket 294 is mounted between the cylinder bracket 210 and the mounting bracket 288, such that the mounting bolts 290 pass through the aligned holes of the bracket 210 and L-shaped bracket 294.

Figure 26:
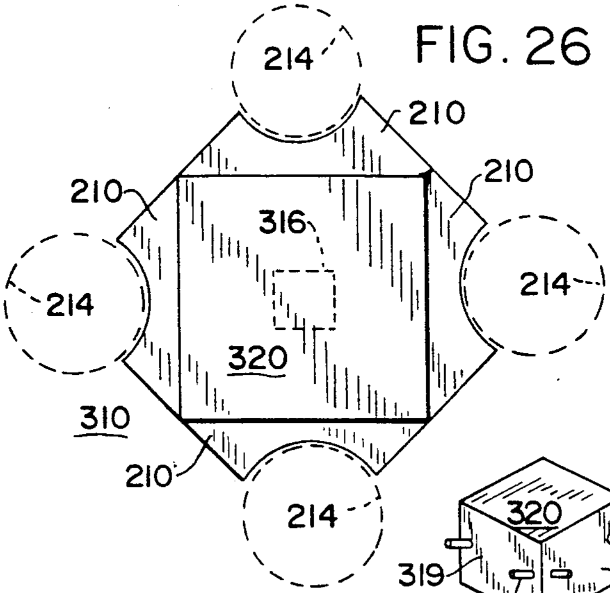
FIG. 26 is a top plan view of the device depicted in FIG. 25.
Figure 27:
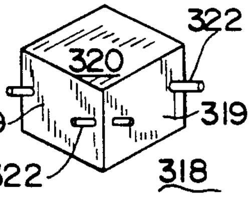
FIG. 27 is a perspective view of a mounting bracket for four cylinder support brackets.
Figure 25:
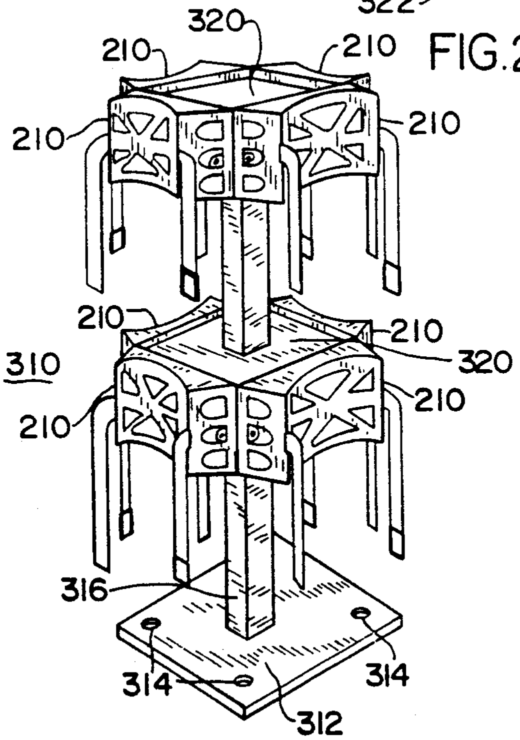
FIG. 25 is a perspective view of a four-cylinder stand utilizing the device depicted in FIG. 17.

FIGS. 25 and 26 depict a four-cylinder mounting stand 310. The stand 310 includes a base 312 having four mounting holes 314 for bolting the device 310 to the floor. A cylinder support bar 316 is welded to the center of the base plate 312 and rises vertically therefrom. As with the two-cylinder support configuration 280, two cylinder brackets 210 are utilized to support each cylinder in a vertical orientation. Thus, the four-cylinder support stand 310 of the present invention utilizes eight cylinder support brackets 210 that are disposed in two sets of four brackets 210, each set being disposed to surround the central support bar 316, as is best seen in FIG. 25. A generally box-shaped mounting bracket 318, see FIG. 27, is utilized to support each of the cylinder brackets 210. As depicted in FIG. 27, the mounting bracket 318 is formed with four generally rectangular mounting plates 319 and a square top plate 320. Bolts 322 are passed through the plates 319 at locations corresponding to the mounting holes 276 formed in bracket 210. A mounting bracket 318 is welded to the top of bar 316, see FIG. 26, to hold the upper cylinder support brackets in position. A second mounting bracket 318, having a square hole formed in its top plate 320, to allow bar 316 to project therethrough, is welded to bar 316 at the position of the lower cylinder support brackets 210.

Figure 28:
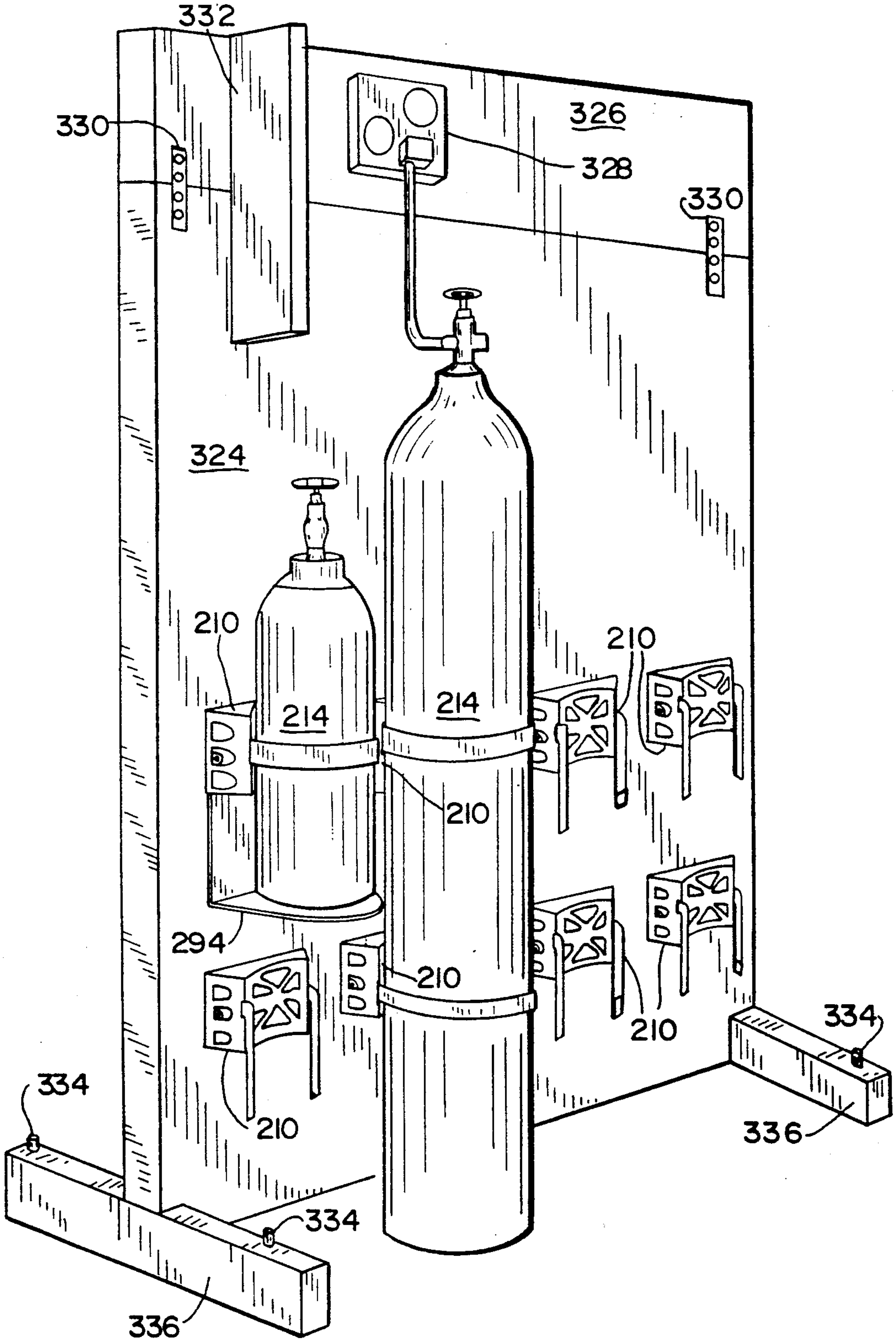
FIG. 28 is a perspective view of the device depicted in FIG. 17 as mounted to a wall.

As is depicted in FIG. 28, the cylinder bracket 210 of the present invention and the L-shaped bracket 294 may be mounted to a wall 324, rather than to the two-cylinder or four-cylinder support bars described hereinabove. When mounted to a wall, as depicted in FIG. 28, the support bolts, such as 292, pass through the bolt holes 276 and 278 and are engaged to the wall 324. An upwardly extending wall section 326 may be joined to the wall 324 to provide support for a gas panel 328 that regulates the flow of gas during processing from cylinder 214. Flat brackets 330 are used to join the wall section 326 to wall 324. A gas panel divider 332 may also be engaged to the walls 324 and 326 to separate gas panels of different cylinders. Floor bolts penetrate through extending foot braces 336 to firmly bolt the wall mounted cylinders to the floor.

While the invention has been particularly shown and described with reference to certain preferred embodiments, it will be understood by those skilled in the art that various alterations and modifications in form and detail may be made therein. Accordingly, it is intended that the following claims cover all such alterations and modifications as may fall within the true spirit and scope of the invention.

What I claim is:

1. A gas cylinder support device for supporting at least one gas cylinder comprising:

a base plate being formed for secure engagement to a floor;

a cylinder support bar being fixedly engaged to said base plate and rising generally vertically therefrom;

two cylinder support brackets being engaged to said support bar to releasably engage each has cylinder therewith;

each said cylinder support bracket being engaged to said support bar utilizing a support bracket engagement means;

each said support bracket including a gas cylinder engagement means being fixedly engaged thereto, each said gas cylinder engagement means including a flexible cylinder engagement member having an adjustable attachment means disposed thereon, said flexible member being engaged to said cylinder support bracket and being formed to pass around said cylinder and releasably join with said adjustable attachment means, whereby said cylinder will be releasably engaged to said support bracket, one of said two support brackets that releasably engage each cylinder being disposed proximate a lower portion of the body of said cylinder, and the other of said two support brackets being disposed proximate an upper portion of the body of said cylinder said cylinder support brackets having outer edge portions extending horizontally from said support bar a distance at least equal to a distance that outer edge portions of said base plate extends from said support bar;

said base plate being formed in cooperation with said support bar and said support bracket engagement means and said cylinder support brackets, such that a base portion of each said cylinder rests fully upon said floor.

2. A gas cylinder support device for supporting two gas cylinders comprising:

a base plate being formed for secure engagement to a floor;

a cylinder support bar being fixedly engaged to said base plate and rising generally vertically therefrom;

four cylinder support brackets being engaged to said support bar and disposed such that two said brackets releasably engage each gas cylinder therewith;

each said cylinder support bracket being engaged to said support bar utilizing a support bracket engagement means;

each said support bracket including a gas cylinder engagement means being fixedly engaged thereto, each said gas cylinder engagement means including a flexible cylinder engagement member having an adjustable attachment means disposed thereon, said flexible member being engaged to said cylinder support bracket and being formed to pass around said cylinder and releasably join with said adjustable attachment means, whereby said cylinder will be releasably engaged to said support bracket, one of said two support brackets that releasably engage each cylinder being disposed proximate a lower portion of the body of said cylinder said cylinder support brackets having outer edge portions extending horizontally from said support bar a distance at least equal to a distance that outer edge portions of said base plate extends from said support bar, and the other of said two support brackets being disposed proximate an upper portion of the body of said cylinder;

said base plate being formed in cooperation with said support bar and bracket engagement means and said cylinder support brackets, such that a base portion of each said cylinder rests fully upon said floor.

3. A gas cylinder support device for supporting four gas cylinders comprising:

a base plate formed for secure engagement to a floor;

a cylinder support bar being fixedly engaged to said base plate and rising generally vertically therefrom;

eight cylinder support brackets being engaged to said support bar and disposed such that two said brackets releasably engage each gas cylinder therewith;

each said cylinder support bracket being engaged to said support bar utilizing a support bracket engagement means;

each said support bracket including a gas cylinder engagement means being fixedly engaged thereto, each said gas cylinder engagement means including a flexible cylinder engagement member having an adjustable attachment means disposed thereon, said flexible member being engaged to said cylinder support bracket and being formed to pass around said cylinder and releasably join with said adjustable attachment means, whereby said cylinder will be releasably engaged to said support bracket, one of said two support brackets that releasably engage each cylinder being disposed proximate a lower portion of the body of said cylinder, and the other of said two support brackets being disposed proximate an upper portion of the body of said cylinder said cylinder support brackets having outer edge portions extending horizontally from said support bar a distance at least equal to a distance that outer edge portions of said base plate extends from said support bar;

said base plate being formed in cooperation with said support bar and said support bracket engagement means and said cylinder support brackets, such that a base portion of each said cylinder rests fully upon said floor.

* * * * *